(12) United States Patent
Yasukawa

(10) Patent No.: US 7,649,821 B2
(45) Date of Patent: Jan. 19, 2010

(54) DISK DISCRIMINATING METHOD AND OPTICAL DISK APPARATUS

(75) Inventor: Takakiyo Yasukawa, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 564 days.

(21) Appl. No.: 11/367,700

(22) Filed: Mar. 6, 2006

(65) Prior Publication Data
US 2006/0280082 A1 Dec. 14, 2006

(30) Foreign Application Priority Data
Jun. 8, 2005 (JP) ............................. 2005-167668

(51) Int. Cl.
*G11B 7/00* (2006.01)
(52) U.S. Cl. .................................. 369/53.2
(58) Field of Classification Search ........................ None
See application file for complete search history.

(56) References Cited
U.S. PATENT DOCUMENTS

| | | | |
|---|---|---|---|
| 6,934,226 B2* | 8/2005 | Yasuda et al. ............ | 369/44.23 |
| 7,123,565 B2* | 10/2006 | Ariyoshi et al. ........... | 369/53.22 |
| 7,260,032 B2 | 8/2007 | Tadano | |
| 7,327,642 B2* | 2/2008 | Yamada et al. ........... | 369/44.29 |
| 2004/0196766 A1 | 10/2004 | Tadano | |
| 2005/0243674 A1* | 11/2005 | Hirai ....................... | 369/53.23 |

FOREIGN PATENT DOCUMENTS

| | | |
|---|---|---|
| JP | 8-185636 A | 7/1996 |
| JP | 2003-123282 | 4/2003 |
| JP | 2004-311004 | 11/2004 |

OTHER PUBLICATIONS

Japanese Office Action issued in Japanese Patent Application No. JP 2005-167668, dated Jun. 9, 2009.

* cited by examiner

*Primary Examiner*—Peter Vincent Agustin
(74) *Attorney, Agent, or Firm*—McDermott Will & Emery LLP

(57) ABSTRACT

The number of the layers of a disk is determined based on focus search to be performed after at least two kinds of spherical aberration correction quantities are set.

14 Claims, 6 Drawing Sheets

FIG.3   PRIOR ART
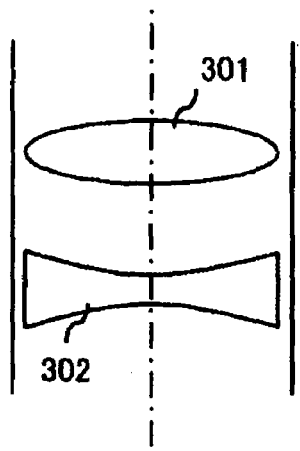
FIG.4A
PRIOR ART
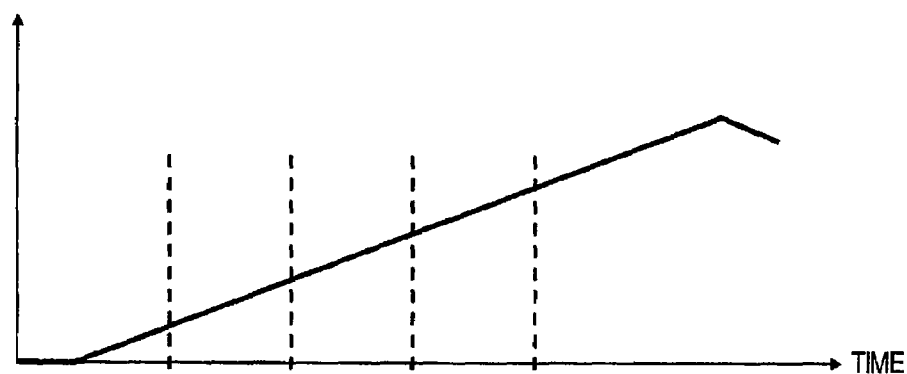
FIG.4B
PRIOR ART
FIG.4C
PRIOR ART
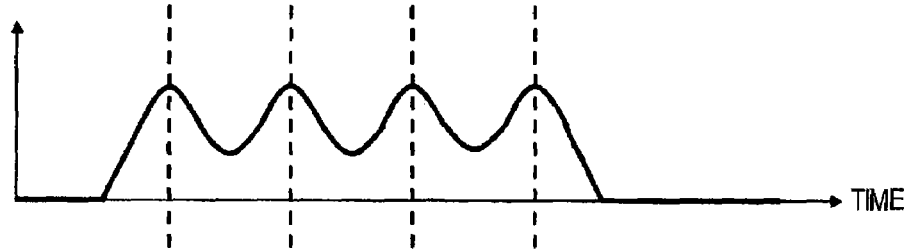

DISK DISCRIMINATING METHOD AND OPTICAL DISK APPARATUS

INCORPORATION BY REFERENCE

The present application claims priority from Japanese application JP2005-167668 filed on Jun. 8, 2005, the content of which is hereby incorporated by reference into this application.

BACKGROUND OF THE INVENTION

1. Filed of the Invention

The present invention relates to optical disk apparatus that record and reproduce information to and from optical disks.

2. Description of the Related Art

Recently, techniques have been developed for making the information layer of optical disks multi-layered to increase the capacity of the optical disks. With optical disk apparatus compatible with recording/reproducing data to/from multi-layered disks, it is necessary to detect the number of information layers of the disk before the disk is determined. An example of the method of detecting the number of information layers of the disk is disclosed in JP-A-08-185636.

Technical development of optical disks as optical information media has furthermore increased the recording density of the disks compared to conventional CDs and DVDs. For example, optical disks of high-density large-capacity called Blue-ray Disks (BDs) have been developed recently. In order to increase the density of the BDs further compared to the CDs and DVDs, the BDs are designed such that the aperture number (NA) of an object lens that focuses light on the optical disk is increased and an light spot that reproduces the records is reduced in size. However, since the influence of uneven thickness of the disk substrate that protects the information layer of the optical disk on the spherical aberration is directly proportional to the fourth power of NA, a spherical aberration correction control will tremendously become difficult. Thus, it is essential to provide means for correcting the spherical aberration due to unevenness in the thickness of the disk substrate.

FIG. 1 shows one example of an optical pickup that includes spherical aberration correcting means. Reference numeral 108 denotes a laser light source. The laser light emitted by the laser light source 108 is converted from divergent light beams to substantially parallel ones by a collimating lens 107. The laser light beams then pass through a spherical aberration correction element 104 and are focused on an information surface of an optical disk 101 by an objective lens 102. Laser light beams reflected by the optical disk 101 will trace its original path and then be converted to substantially parallel light beams by the objective lens 102. The light beams are then reflected by a beam splitter 106 and focused by a second collimating lens 109 on a detector 110. The light beams focused by the detector 110 are then converted to an electric signal by which information on the disk is read out in a reproduction signal processor 115. The spherical aberration correction element 104 and the objective lens 102 are driven by actuators 103 and 105, respectively.

The detector 110 has a structure shown in FIG. 2. The detector 110 comprises four subdetectors A, B, C and D arranged as shown, as viewed in the moving direction of tracks. A center circle shown on the detector 110 schematically illustrates focusing of the laser light beams reflected by the disk. Using an arithmetic circuit of FIG. 2, a focus error signal ((b+d)−(a+c)) and a tracking error signal ((b+c)−(a+d)) are produced which are used to correct a distortion of a light spot on the disk. In this case, a, b, c and d depict values representing detected light quantities outputted from the sub-detectors A, B, C and D, respectively. Focus control is performed to control the position of the disk in a light incidence direction, using the focus error signal. Positional control of the disk in a direction perpendicular to the track grooves on the disk comprises tracking control using the track error signal so as to follow the track grooves. The focus and tracking error signals drive an actuator 102 so as to correct respective follow-up error components in focus and tracking error detectors 112 and 113. Each of a reproduction signal processor 115, the focus error detector 112, the tracking error detector 113, and a spherical aberration correction circuit 114 in a servo circuit 111 are controlled by communication with a microcomputer 116. A memory has stored initial values, adjusted values, etc., in the control of the microcomputer.

As means for correcting a spherical aberration due to unevenness of the thickness of the disk substrate, a liquid-crystal spherical aberration correction element and a beam expander are used. Although the liquid crystal spherical aberration correction element is not shown, it is possible to modulate the wave front of the light beams by applying required voltages to the aberration correction element, thereby changing its refractive index. Next, the beam expander will be described in FIG. 3. In FIG. 3, a combination of positive and negative lens groups 301 and 302 is used to modulate the wave front of the light beams by adjusting the space between the positive and negative lens groups 301 and 302. In order to drive these lens groups, a combination of a piezoelectric element and a screw feed system can be used.

A method of detecting the number of information layers of a multi-layered disk will be described briefly with reference to FIGS. 4A to 4C, which illustrate focus search to be performed in an optical disk that has four information layers, for example. The focus search refers to driving a focus driver like a triangular-wave signal having a frequency, for example, of 2 Hz or so, thereby moving the optical pickup back and forth in the direction of the focus control. FIG. 4A shows information on the position of the optical pickup; FIG. 4B shows changes in the focus error signal; and FIG. 4C shows changes in the whole light quantity. In each of these figures, the horizontal axis shows time elapse. There are flex points 401, 402, 403 and 404, in FIG. 4B where the information layers pass. The focus error signal swings greatly before and after a zero point where the focus error signal passes. Thus, it is possible to detect the fact that the focus error signal has passed through the zero point using threshold detection that comprises detecting that the focus error signal has increased beyond desired reference voltages 1 and 2 provided on the positive and negative sides, respectively, of the focus error signal. The number of information layers of the disk detected at this time will be counted by the microcomputer 116.

SUMMARY OF THE INVENTION

In the threshold detection, if the aperture number is approximately 0.6 like the conventional DVDs, the influence of the spherical aberration is relatively low and the threshold detection is easy to perform.

With optical disk apparatus having a large aperture number as in the BDs, the detection accuracy of the focus error signal in the focus search will decrease due to a spherical aberration due to unevenness of the thickness of the disk substrate and/or due to astigmatism.

It is therefore an object of the present invention to solve this problem and to provide a method of determining the number of information layers of a multi-layered disk, and an optical disk apparatus using the method.

The present invention provides an optical disk determining method to be used when information on an optical disk in which a plurality of information layers are laminated is reproduced by an optical disk apparatus comprising: a laser light source for emitting laser light beams to record or reproduce the information on the optical disk; a collimating lens for converting the laser light beams from divergent light beams to substantially parallel light ones; an objective lens for focusing the laser light beams as a light spot onto the optical disk; means for correcting a spherical aberration on the light spot; means for detecting part of the light beams reflected by the optical disk; means for detecting the number of information layers of the optical disk based on the reflected part of the light beams; and a memory for storing the detected number of information layers of the optical disk. In the method, when the number of information layers is determined, at least two spherical aberration correction values are set in corresponding different steps, respectively, in the spherical aberration correcting means. This process can be performed by the apparatus.

According to the present invention, an optical disk determining method and an optical disk apparatus compatible with an optical disk of a plurality of layers are provided.

Other objects, features and advantages of the invention will become apparent from the following description of the embodiments of the invention taken in conjunction with the accompanying drawings.

BRIEF DESCRIPTION OF THE DRAWINGS

FIG. 3 illustrates an example of a beam expander;
FIGS. 4A to 4C illustrate conventional focus error signal.

DETAILED DESCRIPTION OF THE EMBODIMENT

Figure 1:
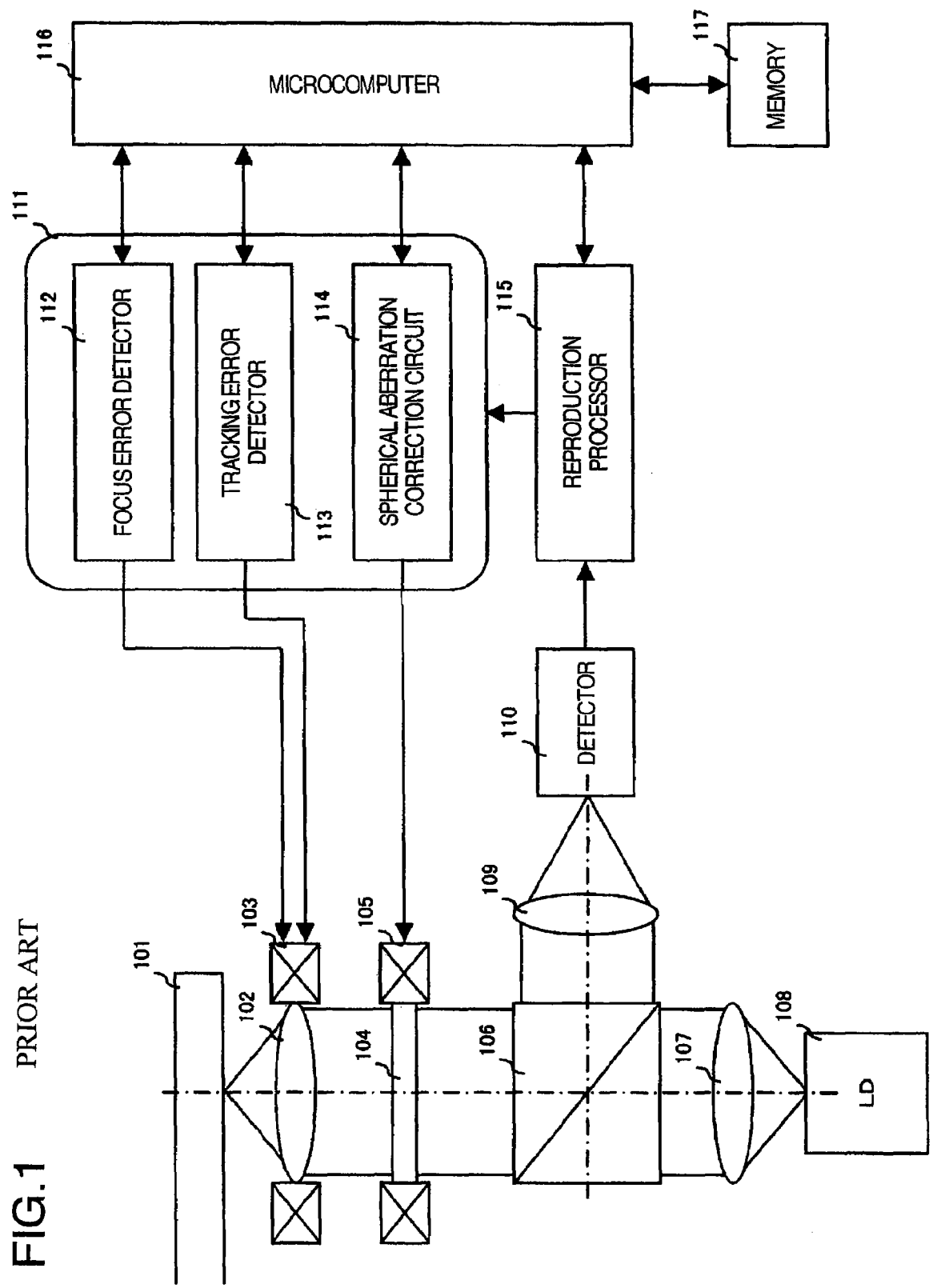
FIG. 1 schematically illustrates an optical disk apparatus.
Figure 2:
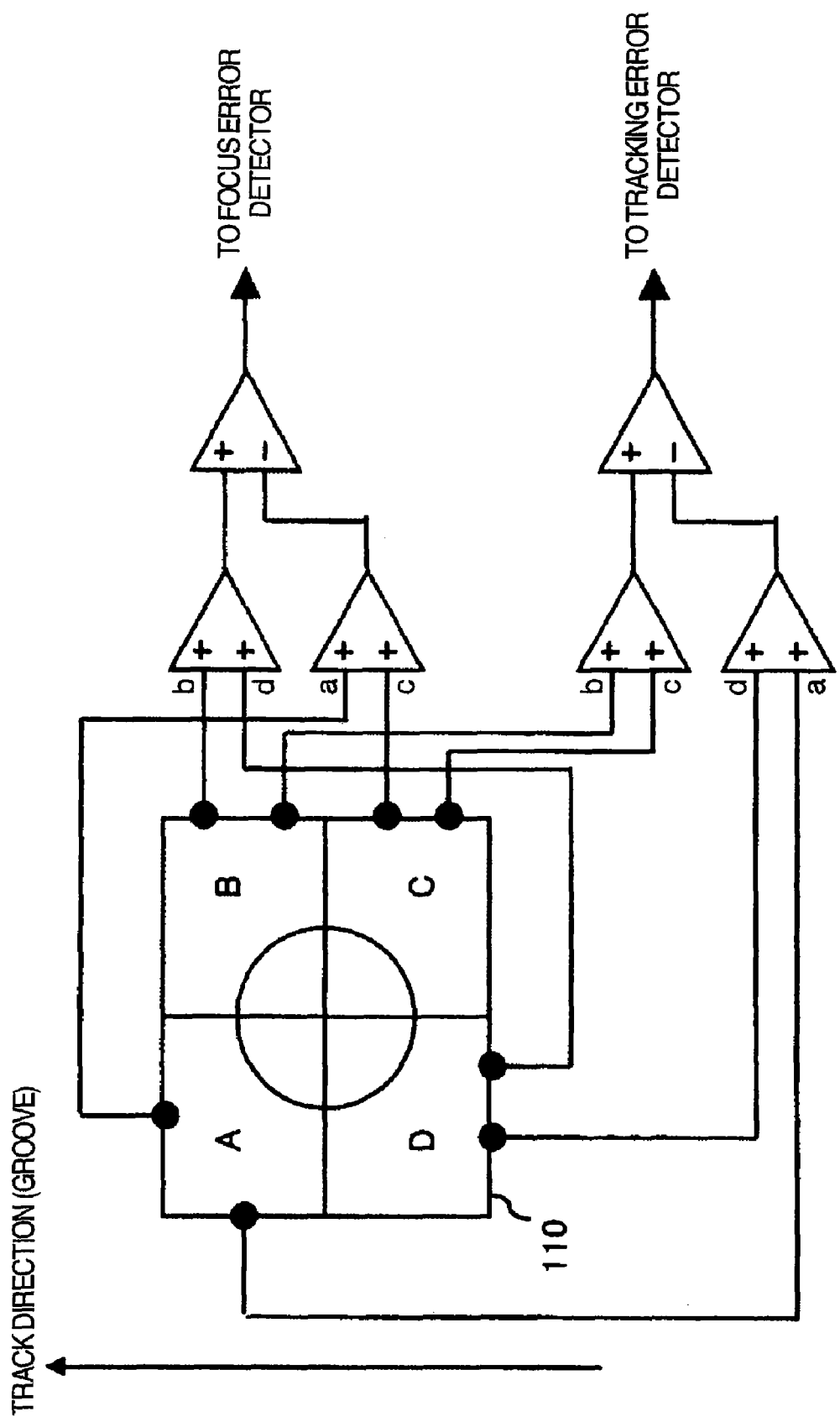
FIG. 2 illustrates a focus error signal and a tracking error signal.

Referring to the drawings, an embodiment of the present invention will be described. Standard spherical aberration correction quantities in each optical disk apparatus are stored beforehand in a memory. More specifically, in the shipment of the optical disk apparatus from the factory, optimal values (optimal spherical aberration correction quantities) of the respective $L_0$ and $L_1$ layers obtained when the optical disk apparatus was adjusted using a standard disk (for example, a standard double-layered disk such as a Blue-ray Disk) are stored beforehand in the memory. Now, let $x_1$ and $x_2$ be the distances from the optical disk's surface to its $L_0$ and $L_1$ layers, respectively. The adjusting method to be used may be a conventional one. A two or more layered disk is preferably used as the one to be adjusted beforehand.

Figure 5:
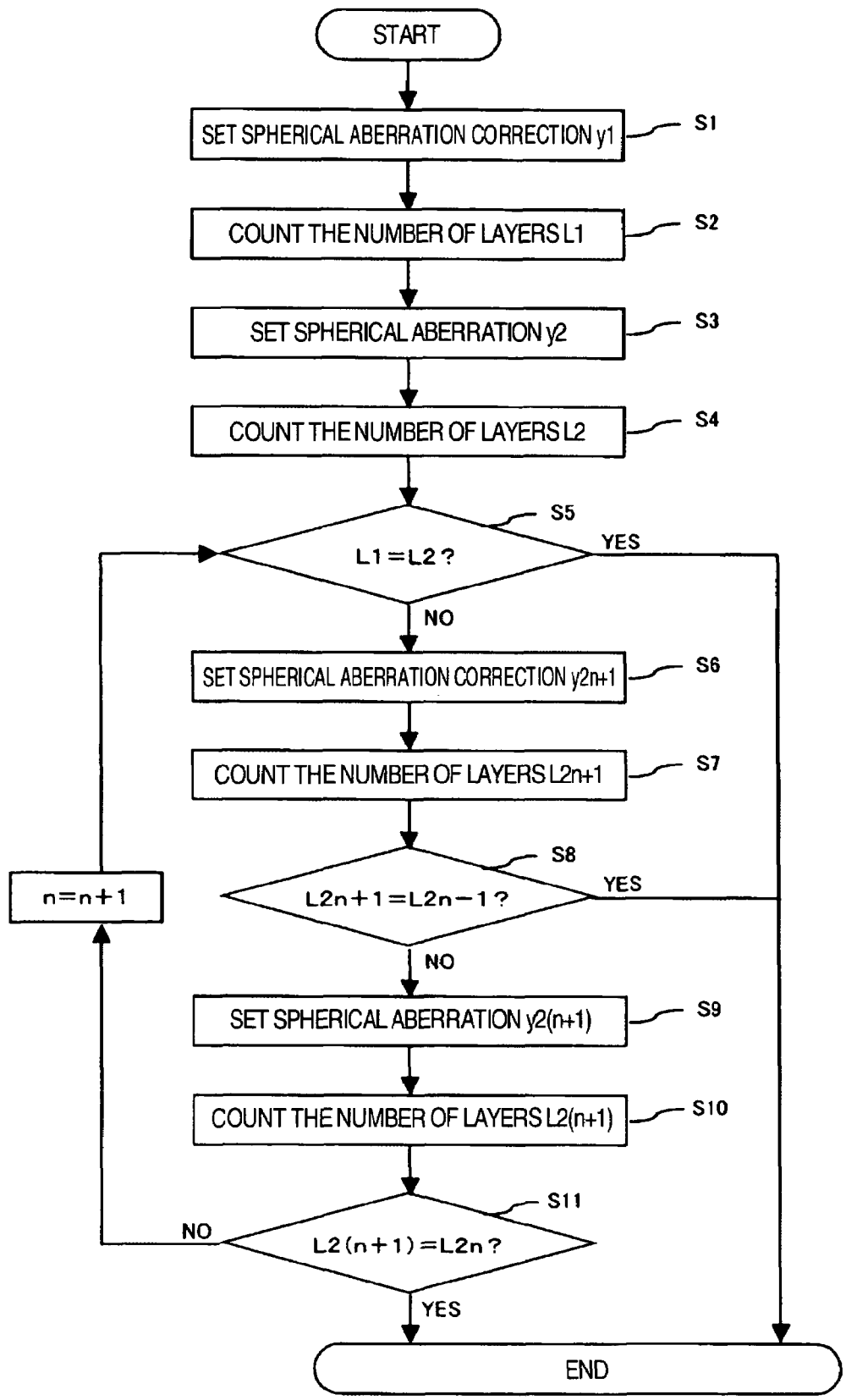
FIG. 5 is a flowchart of a process to be performed by an embodiment of the present invention.

FIG. 5 is a flowchart of operation of the embodiment of the present invention. First, step S1 sets as $y_1$ a spherical aberration correction value of the $L_0$ layer of the disk obtained beforehand in the adjustment of the apparatus in its shipment from the factory. That is, the step S1 sets the spherical aberration correction value $y_1$ corresponding to the distance $x_1$ from the optical disk surface to the $L_0$ layer.

Then in step S2 the focus search is performed. The number of information layers $L_1$ corresponding to the spherical aberration correction value $y_1$ is obtained as a result of first detection of the number of layers of the disk from the number of thresholds detected at this time. Since the number of information layers $L_1$ obtained becomes a reference to be compared in the subsequent steps, it is stored in the memory. Likewise, the maximum and minimum values of the focus error signal before and after zero points are stored in the memory.

Subsequently, a step S3 sets as $y_2$ the spherical aberration correction value of the $L_1$ layer of the disk beforehand obtained in the adjustment in the shipment from the factory. That is, the step S3 sets the spherical aberration correction value $Y_2$ corresponding to a distance $x_2$ from the optical disk surface to the $L_1$ layer. While in the steps S1 and S3 the spherical aberration correction quantities were used as values for the $L_0$ and $L_1$ layers of the double-layered disk, these values are recommendable ones, and not limited to them. Of course, these values are preferably unique to the respective optical disk apparatus.

Then in step S4, the focus search is performed. The number of information layers $L_2$ corresponding to the spherical aberration correction value $y_2$ is obtained as a result of second detection of the number of layers based on the number of detected thresholds obtained at this time. The number of information layers $L_2$ obtained here is likewise stored in the memory. Likewise, the maximum and minimum values of the focus error signal before and after the zero points are stored in the memory.

Then in step S5 the numbers of information layers obtained by the two focus searches are compared. If they are equal, it is implied that the number of information layers has been detected correctly irrespective of the influence of the spherical aberration, thereby terminating the determination of the number of layers. If not, it is implied that the number of information layers was not detected correctly by one or both of the searches.

Figure 6A:
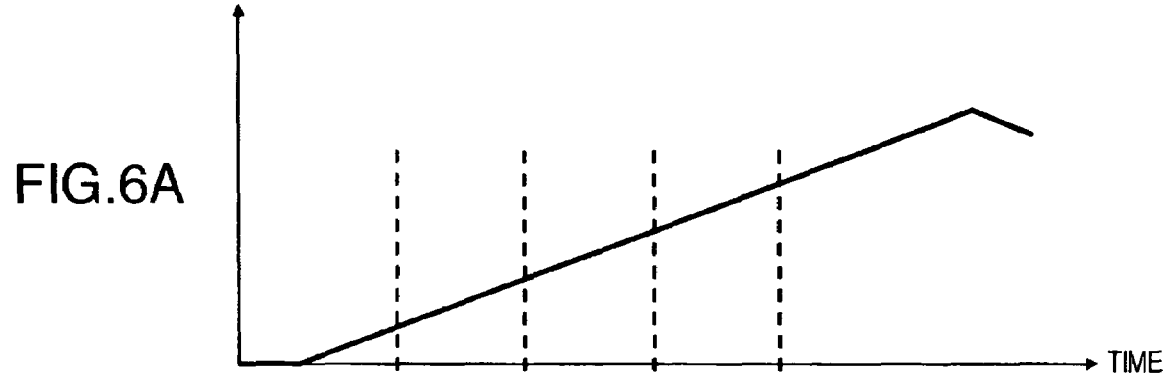
FIGS. 6A to 6C illustrate focus error signals involved in the embodiment.
Figure 6B:
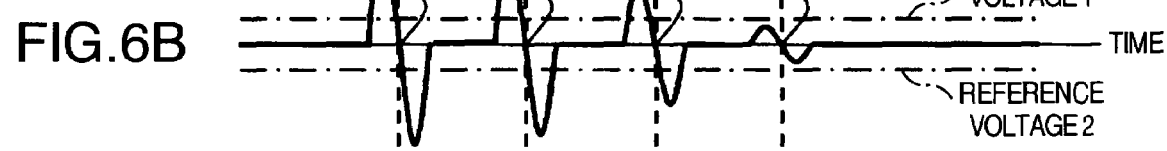
Figure 6C:
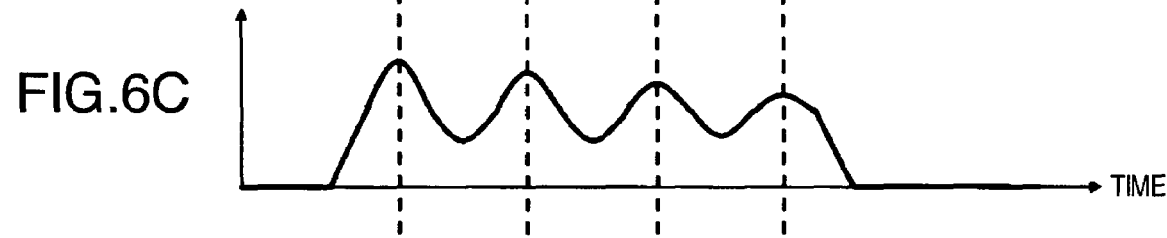
Figure 7:
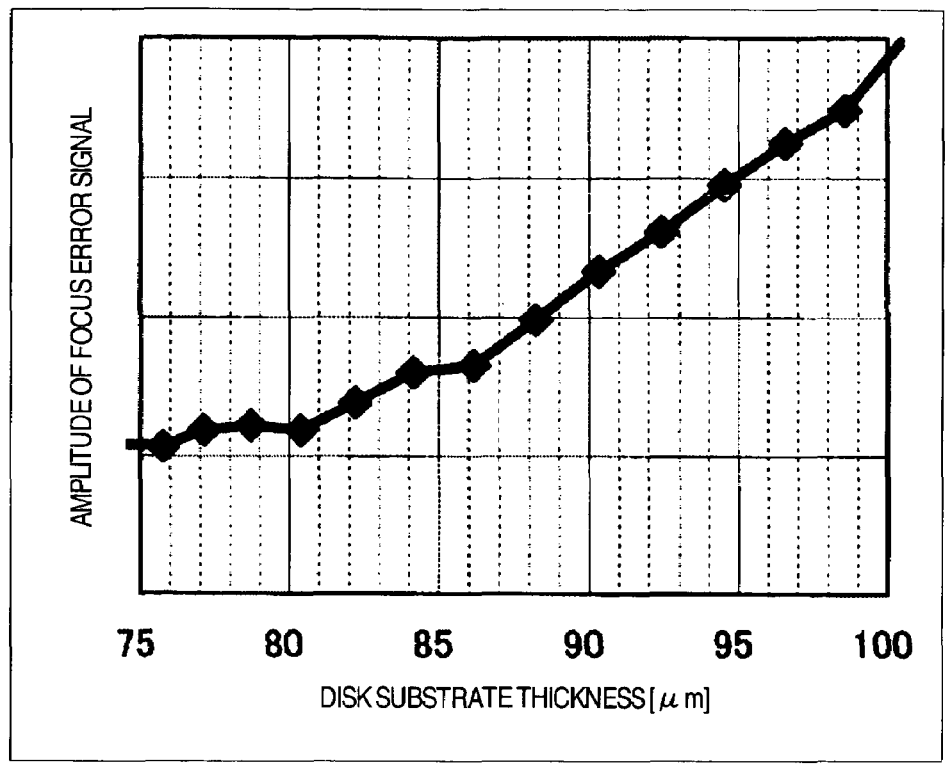
FIG. 7 is a graph of spherical aberration correction.

The case in which the results did not coincide in step S5 will be described in more detail with reference to FIGS. 6A-6C, which shows a result of the focal search similar to that of FIGS. 4A-4C. That is, FIG. 6A shows information on the position of the optical pickup; FIG. 6B shows changes in the focus error signal; and FIG. 6C shows changes in the whole light quantity. In each of these figures, the horizontal axis shows time elapse. FIGS. 6A-6C are different from FIGS. 4A-4C in that an aperture number of approximately 0.85 is used instead of approximately 0.6, which clearly shows the occurrence of a remarkable influence of the spherical aberration. While FIG. 6 is schematic, FIG. 7 is, for example, a graph of a thickness of the disk substrate versus a focus error signal amplitude used in the focus search wherein the spherical aberration correction value is set such that the focus error signal becomes maximum when the substrate is 100 μm thick. With a standard double-layered disk such as a BD, for example, the disk substrate is 100 μm thick and the $L_1$ layer is 75 μm thick. Thus, there is a difference of 25 μbetween both. In this case, it was found as a result of measurement that the amplitude of the focus error signal was reduced to approximately ¼ of its normal value. When $x_1$ is 100 μm and the substrate is 100 μm thick at this time, $y_1$ is set as the spherical aberration correction value in step S1 such that the focus error signal becomes maximum. In this case, zero points 602 (at the position of a substrate approximately 83.3 μm thick), 603 (at the position of a substrate approximately 91.6 μm thick) and

604 (at the position of a substrate approximately 100 μm thick) are correctly beyond the reference voltages 1 and 2 while a zero point 601 (at the position of a substrate thickness of approximately 75 μm) is not beyond the reference voltage 1 or 2. Thus, the number of information layers of $L_1$ is counted as three layers 602, 603 and 604 (S2). When the $x_2$ is approximately 91.6 μm, $y_2$ is set to the spherical aberration correction value in step S3 such that the focus error signal becomes maximum when the substrate is approximately 91.6 μm thick. Thus, the focus error signals are beyond the reference voltages 1 and 2 for all the four layers 601-604. Thus, $L_2$ is counted as four layers (S4). After the results of detection of $L_1$ and $L_2$ become unequal as just described above, in the next step x is set to approximately 83.3 μm. Furthermore, a value of y such as maximizes the focus error signal when the substrate is approximately 83.3 μm thick is set to the spherical aberration correction value. In this case, the focus error signal goes beyond the reference voltages 1 and 2 for all the four layers 601-604. Thus, L is counted as four layers, which is then found by comparison to equal the result of detection of L2 (S5). Thus, determination of the number of layers is terminated. Thus, it can be said that in order to detect the number of information layers of a multi-layered disk, is effective to detect the spherical aberration correction value using at least two kinds of set values. Note that it is assumed herein that when the NA is 0.85, it is possible to detect two layers on each side of the substrate in its thickness direction where the spherical aberration correction value in which the focus error signal becomes maximum is set. That is, this example illustrated detecting all the number of layers as 5=2×2+1, including the substrate as a central layer where the spherical aberration correction value in which the focus error signal becomes maximum is set. The number of layers detectable varies depending on the threshold voltages. Hence, it can be considered to be expressed in a generalized form such as 2N+1 where N is an integer and is not limited to 5.

Figure 8:
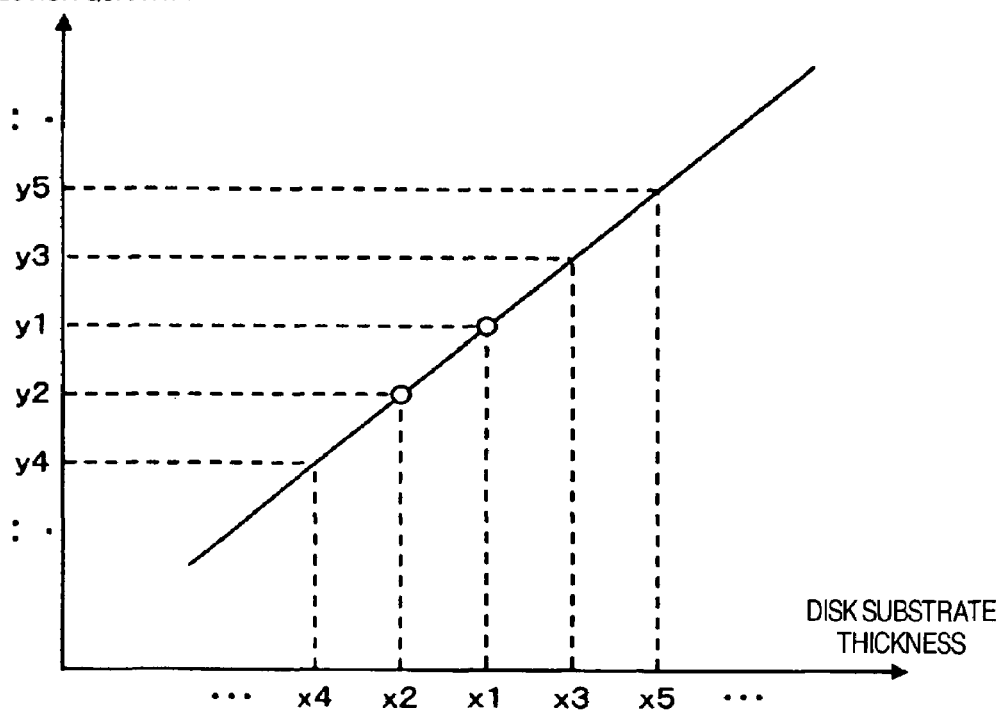
FIG. 8 illustrates a relationship between disk substrate thickness and spherical aberration correction quantity.

The above is shown in step S6 and its subsequent steps. After the result of comparison in step S5 is NO, in step S6 a spherical aberration correction quantity $y_3$ (that is, y2n+1, where n is 1) (S6), which equals to the correction quantity $y_2$ given in step S3, is set for the preset spherical aberration correction value $y_1$ in a direction reverse to that in which $y_2$ was given. FIG. 8 shows a relationship between disk substrate thickness and spherical aberration correction quantity. Reference characters $x_1, x_2, x_3, \ldots$ denote the respective thicknesses of disk substrates. Reference characters $y_1, y_2, y_3, \ldots$ denote spherical aberration correction quantities estimated to be optimal to the respective disk substrate thicknesses. The numerals denote respective turns for the corresponding aberration correction quantities to be set actually.

These turns, however, need not necessarily follow FIG. 8. For example, spherical aberration correction quantities may be set only for larger disk substrate thicknesses. Furthermore, it may be arranged that the amplitudes (i.e., maximum-minimum values) of the focus error signal before and after the zero points stored in the memory in the layer number counting process are calculated, a layer where the focus error signal has a maximum amplitude is found by comparison and then the aberration correction quantities are set for layers including as exactly or substantially a central one the layer where the focus error signal has the maximum amplitude. There is a possibility that when the number of layers of a disk to be detected decreases, spherical aberration correction values are set away from the disk substrate where recorded layers are assumed to be present actually in the direction of thickness of the substrate. Thus, the spherical aberration correction quantities should be changed to be set in the reverse direction.

Then in step S7 a third focus search is performed. The number of information layers $L_3$ (that is, L2n+1, where n is 1) is obtained from the detected number of thresholds obtained at this time. The number of information layers $L_3$ obtained is also stored in the memory. Likewise, the maximum and minimum values of the focus error signal before and after the zero points are stored in the memory.

Subsequently in step S8 the number of information layers obtained in the first and third focus searches will be compared. In this case, the reason why the former number of information layers was selected as an object to be compared with the latter number of layers is only as an example. The difference in disk substrate thickness between two points where the measurement should be performed may be changed based on a relationship (or detection accuracy) between the detection sensitivity (or detection threshold) of the focus error signal and the difference in disk substrate thickness between the two points where the measurement should be made.

As described above, according to the embodiment, the optical disk determining method includes the steps of: (S1) setting in the spherical aberration correcting circuit a spherical aberration correction value $y_1$ corresponding to a distance $x_1$ from a surface of the optical disk; (S2) performing a focus search, thereby detecting the number of layers $L_1$; (S3) setting in the spherical aberration correcting circuit a spherical aberration correction value $y_2$ (where $y_2<y_1$) corresponding to a distance $x_2$ (where $X_2<x_1$) from the surface of the optical disk; (S4) performing a focus search, thereby detecting the number of layers $L_2$; and determining the number of information layers based on $L_1$ and $L_2$. Further, the optical disk determining method includes the steps of: (S5) comparing $L_1$ and $L_2$ after the step S4; and using the number of information layers as that of the optical disk when $L_1$ equals $L_2$. Further, the optical disk determining method includes the steps of: (S6) setting in the spherical aberration correcting circuit a spherical aberration correction value $y_{2n+1}$ (where $y_{2n+1}>y_{2n-1}$) obtained by substituting after the step S5 a value indicative of a distance $x_{2n+1}$ (where $x_{2n+1}>x_{2n-1}$; and n is a natural number equal to, or greater than, 1) from a recording surface of the optical disk, $y_{2n+1}$ corresponding to $x_{2n+1}$, into a straight line connecting points $(x_1, y_1)$ and $(x_2, y_2)$; (S7) performing a focus search, thereby detecting the number of layers $L_{2n+1}$; (S8) comparing $L_{2n+1}$ and $L_{2n-1}$; and performing the steps S6 to S8 when L1 differs from L2 in the step S5, and using the number of information layers as that of the optical disk when $L_{2n+1}$ equals $L_{2n-1}$ in the step S8.

If the same number of layers is not detected in step S8 either, recorded layers are considered as present in the direction reverse to that of thickness of the disk substrate employed as the initial value. Then, spherical aberration correction quantities are set and the number of layers is detected. If the number of layers is not detected correctly, it is determined that the disk substrate thickness should be considered to be different from an assumed one and a different spherical aberration correction quantity is set, thereby performing the process again, starting with the step S5.

Thus, according to the embodiment, the optical disk determining method further includes the steps of: (S9) setting in the spherical aberration correcting circuit a spherical aberration correction value $y_{2(n+1)}$ (where $y_{2(n+1)}<y_{2n}$) obtained by substituting after the step S8 a value indicative of a distance $x_{2(n+1)}$ (where $x_{2(n+1)}<x_{2n}$) from a recording surface of the optical disk, $y_{2(n+1)}$ corresponding to $x_{2(n+1)}$, into a straight line connecting points $(x_1, y_1)$ and $(x_2, y_2)$; (S10) performing a focus search, thereby detecting the number of layers $L_{2(n+1)}$; (S11) comparing $L_{2(n+1)}$ and $L_{2n}$; and performing the steps S9 to S11 when $L_{2n+1}$ differs from $L_{2n-1}$ in the step S8, using the number of information layers as that of the optical disk when $L_{2(n+1)}$ equals $L_{2n}$ in the step S11. Further, the optical disk determining method includes the steps of: (S12) carrying out an operation n=n+1 after the step S11 and then returning to the step S6; and performing the step S12 when $L_2$ (n+1) differs from $L_{2n}$ in the step S11, and then repeating the steps S6 to S12 until $L_{2n+1}$ equals $L_{2n-1}$ in the step S8 or until $L_{2(n+1)}$ equals $L_2$, in the step S11; and using the number of information layers as that of the optical disk when $L_{2n+1}$ equals $L_{2n-1}$ in the step S8 or when $L_{2(n+1)}$ equals $L_{2n}$ in the step S11.

While in the present invention a focus offset quantity is not described especially, it may be set to the objective lens driving actuator 103 along with a corresponding spherical aberration correction quantity depending on the disk substrate thickness at and in the same time and manner as the spherical aberration correction quantity is set to the spherical aberration correction circuit 114. By using the above process, even the number of information layers of a disk device whose aperture number is 0.8 or more can be determined correctly using the optical disk apparatus according to the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk discriminating method to be used when information on an optical disk in which a plurality of information layers are laminated is reproduced by an optical disk apparatus comprising:
    a laser light source for emitting laser light beams to record or reproduce the information on the optical disk;
    a collimating lens for converting the laser light beams from divergent light beams to substantially parallel light ones;
    an objective lens for focusing the laser light beams as a light spot onto the optical disk;
    a spherical aberration correction circuit for correcting a spherical aberration on the light spot;
    a detector for detecting part of the light beams reflected by the optical disk;
    an information layer number detector for detecting a number of information layers of the optical disk based on the reflected part of the light beams; and
    a memory for storing the detected number of information layers of the optical disk,
    the method comprising the steps of:
    setting a first spherical aberration correction value in the spherical aberration correcting circuit, thereby performing a focus search to thereby obtain a number $L_1$ of layers; and
    setting a second spherical aberration correction value in the spherical aberration correcting circuit, thereby performing a focus search to thereby obtain a number $L_2$ of layers and determining the number of the information layers of the optical disk based on the numbers $L_1$ and $L_2$.

2. An optical disk discriminating method to be used when information on an optical disk in which a plurality of information layers are laminated is reproduced by an optical disk apparatus comprising:
    a laser light source for emitting laser light beams to record or reproduce the information on the optical disk;
    a collimating lens for converting the laser light beams from divergent light beams to substantially parallel light ones;
    an objective lens for focusing the laser light beams as a light spot onto the optical disk;
    a spherical aberration correcting circuit for correcting a spherical aberration on the light spot;
    a detector for detecting part of the light beams reflected by the optical disk;
    an information layer number detector for detecting a number of information layers of the optical disk based on the reflected part of the light beams; and
    a memory for storing the detected number of information layers of the optical disk,
    the method comprising the steps of:
    (1) setting in the spherical aberration correcting circuit a spherical aberration correction value $y_1$ corresponding to a distance $x_1$ from a surface of the optical disk;
    (2) performing a focus search after the step (1), thereby detecting the number of layers $L_1$;
    (3) setting in the spherical aberration correcting circuit a spherical aberration correction value $y_2$ (where $y_2 < y_1$) corresponding to a distance $x_2$ (where $x_2 < x_1$) from the surface of the optical disk after the step (2);
    (4) performing a focus search after the step (3), thereby detecting the number of layers $L_2$; and
    determining the number of information layers based on $L_1$ and $L_2$.

3. The method of claim 2, further comprising the step of:
    (5) comparing $L_1$ and $L_2$ after the step (4); and
    using the number of information layers as that of the optical disk when $L_1$ equals $L_2$.

4. The method of claim 3, further comprising the steps of:
    (6) setting in the spherical aberration correcting circuit a spherical aberration correction value $y_{2n+1}$ (where $y_{2n+1} > y_{2n-1}$) obtained by substituting after the step (5) a value indicative of a distance $x_{2n+1}$ (where $x_{2n+1} > x_{2n-1}$; and n is a natural number equal to, or greater than, 1) from a recording surface of the optical disk, $y_{2n+1}$ corresponding to $x_{2n+1}$, into a straight line connecting points $(x_1, y_1)$ and $(x_2, y_2)$;
    (7) performing a focus search after the step (6), thereby detecting the number of layers $L_{2n+1}$;
    (8) comparing $L_{2n+1}$ and $L_{2n-1}$ after the step (7); and
    performing the steps (6)-(8) when $L_1$ differs from $L_2$ in the step (5), and using the number of information layers as that of the optical disk when $L_{2n+1}$ equals $L_{2n-1}$ in the step (8).

5. The method of claim 4, further comprising the steps of:
    (9) setting in the spherical aberration correcting circuit a spherical aberration correction value $y_{2(n+1)}$ (where $y_{2(n+1)} < y_{2n}$) obtained by substituting after the step (8) a value indicative of a distance $x_{2(n+1)}$ (where $x_{2(n+1)} < x_{2n}$) from a recording surface of the optical disk, $y_{2(n+1)}$ corresponding to $x_{2(n+1)}$, into a straight line connecting points $(x_1, y_1)$ and $(x_2, y_2)$;
    (10) performing a focus search after the step (9), thereby detecting the number of layers $L_{2(n+1)}$;
    (11) comparing $L_{2(n+1)}$ and $L_{2n}$ after the step (10); and
    performing the steps (9)-(11) when $L_{2+1}$ differs from $L_{2n-1}$ in the step (8), and using the number of information layers as that of the optical disk when $L_{2(n+1)}$ equals $L_{2n}$ in the step (11).

6. The method of claim 5, further comprising the steps of:
    (12) carrying out an operation n=n+1 after the step (11) and then returning to the step (6);
    performing the step (12) when $L_{2\ (n+1)}$ differs from $L_{2n}$ in the step (11), and then repeating the steps (6)-(12) until $L_{2n+1}$ equals $L_{2n-1}$ in the step (8) or until $L_{2\ (n+1)}$ equals $L_{2n}$ in the step(11); and using the number of information layers as that of the optical disk when $L_{2n+1}$ equals $L_{2n-1}$ in the step (8) or when $L_{2(n+1)}$ equals $L_{2n}$ in the step (11).

7. The method according to claim 2 further comprising the step of:
setting in an objective lens driving actuator a focus offset value corresponding to a distance from the surface of the optical disk when the spherical aberration correction value is set in the spherical aberration correcting circuit.

8. An optical disk apparatus for recording information into and reproducing information from an optical disk having a plurality of information layers, comprising:
a laser light source for emitting laser light beams to record or reproduce the information on the optical disk;
a collimating lens for converting the laser light beams from divergent light beams to substantially parallel light ones;
an objective lens for focusing the laser light beams as a light spot onto the optical disk;
a spherical aberration correction circuit for correcting a spherical aberration on the light spot;
a detector for detecting part of the light beams reflected by the optical disk;
an information layer number detector for detecting a number of information layers of the optical disk based on the reflected part of the light beams; and
a memory for storing the detected number of information layers of the optical disk, wherein:
the optical disk apparatus sets a first spherical aberration correction value in the spherical aberration correcting circuit, thereby performing a focus search to thereby obtain a number $L_1$ of layers, and
the optical disk apparatus sets a second spherical aberration correction value in the spherical aberration correcting circuit, thereby performing a focus search to thereby obtain a number $L_2$ of layers and determining the number of the information layers of the optical disk based on the numbers $L_1$ and $L_2$.

9. An optical disk apparatus for recording information into and reproducing information from an optical disk having a plurality of information layers, comprising:
a laser light source for emitting laser light beams to record or reproduce the information on the optical disk;
a collimating lens for converting the laser light beams from divergent light beams to substantially parallel light ones;
an objective lens for focusing the laser light beams as a light spot onto the optical disk;
a spherical aberration correction circuit for correcting a spherical aberration on the light spot;
a detector for detecting part of the light beams reflected by the optical disk;
an information layer number detector for detecting a number of information layers of the optical disk based on the reflected part of the light beams; and
a memory for storing the detected number of information layers of the optical disk, wherein:
the optical disk apparatus sets in the spherical aberration correcting circuit a spherical aberration correction value $y_1$ corresponding to a distance $x_1$ from a surface of the optical disk, then performs a focus search to thereby detect a number $L_1$ of layers, then
the optical disk apparatus sets in the spherical aberration correcting circuit a spherical aberration correction value $y_2$ (where $y_2 < y_1$) corresponding to a distance $x_2$ (where $x_2 < x_1$) from the surface of the optical disk, then performs a focus search to thereby detecting a number $L_2$ of layers, and the optical disk apparatus determines the number of information layers based on the numbers $L_1$ and $L_2$.

10. The optical disk apparatus of claim 9, wherein the optical disk apparatus:
compares $L_1$ and $L_2$ after performing a focus search; and
uses the number of information layers as that of the optical disk when $L_1$ equals $L_2$.

11. The optical disk apparatus of claim 10, wherein the optical disk apparatus:
sets in the spherical aberration correcting circuit a spherical aberration correction value $y_{2n+1}$ (where $y_{2n+1} > y_{2n-1}$) obtained by substituting a value indicative of a distance $X_{2n+1}$ (where $x_{2n} > x_{2n-1}$), wherein n is a natural number equal to or greater than 1) from a recording surface of the optical disk, $y_{2n+1}$ corresponding to $x_{2n+1}$, into a straight line connecting points $(x_1, y_1)$ and $(x_2, y_2)$;
performs a focus search to thereby detect a number $L_{2n-1}$ of layers, then compares $L_{2n+1}$ and $L_{2n-1}$;
when $L_1$ differs from $L_2$, sets in the spherical aberration correcting circuit a spherical aberration correction value $y_{2n+1}$ (where $y_{2n+1} > y_{2n-1}$) obtained by substituting a value indicative of a distance $x_{2n+1}$ (where $x_{2n+1} > x_{2n-1}$); and n is a natural number equal to or greater than 1) from a recording surface of the optical disk, $y_{2n+1}$ corresponding to $x_{2n+1}$, into a straight line connecting points $(x_1, y_1)$ and $(x_2, y_2)$; and
performs a focus search to thereby detect a number $L_{2n-1}$ of layers, then compares $L_{2n+1}$ and $L_{2n-1}$.

12. The optical disk apparatus of claim 11, wherein the optical disk apparatus:
sets in the spherical aberration correcting circuit a spherical aberration correction value $y_{2(n+1)}$ (where $y_{2(n+1)} < y_{2n}$) obtained by substituting a value indicative of a distance $x_{2(n+1)}$ (where $x_{2(n+1)} < x_{2n}$) from a recording surface of the optical disk, $y_{2(n+1)}$ corresponding to $x_{2(n+1)}$, into a straight line connecting points $(x_1, y_1)$ and $(x_2, y_2)$;
performs a focus search, thereby detecting the number of layers $L_{2(n+1)}$;
compares $L_{2(n+1)}$ and $L_{2n}$;
when $L_{2n+1}$ differs from $L_{2n-1}$, sets in the spherical aberration correcting circuit a spherical aberration correction value $y_{2(n+1)}$ (where $y_{2(n+1)} < y_{2n}$) obtained by substituting a value indicative of a distance $x_{2(n+1)}$ (where $x_{2(n+1)} < x_{2n}$) from a recording surface of the optical disk, $y_{2(n+1)}$ corresponding to $x_{2(n+1)}$, into a straight line connecting points $(x_1, y_1)$ and $(x_2, y_2)$;
performs a focus search, thereby detecting the number of layers $L_{2(n+1)}$;
compares $L_{2(n+1)}$ and $L_{2n}$, and uses the number of information layers as that of the optical disk when $L_{2(n+1)}$ equals $L_{2n}$.

13. The optical disk apparatus of claim 12, wherein the optical disk apparatus:
carries out an operation $n = n+1$ when $L_{2(n+1)}$ differs from $L_{2n}$, and
uses the number of information layers as that of the optical disk when $L_{2n+1}$ equals $L_{2(n-1)}$ or when $L2(n+1)$ equals $L_{2n}$.

14. The optical disk apparatus of claim 9, wherein the disk sets in an objective lens driving actuator a focus offset value corresponding to a distance from the surface of the optical disk when the spherical aberration correction value is set in the spherical aberration correcting circuit.

* * * * *